United States Patent
Miyashita et al.

(10) Patent No.: US 10,305,095 B2
(45) Date of Patent: May 28, 2019

(54) METHOD OF PRODUCING POSITIVE ELECTRODE ACTIVE MATERIAL FOR NON-AQUEOUS ELECTROLYTE SECONDARY BATTERY, POSITIVE ELECTRODE FOR NON-AQUEOUS ELECTROLYTE SECONDARY BATTERY, AND NON-AQUEOUS ELECTROLYTE SECONDARY BATTERY

(71) Applicant: NICHIA CORPORATION, Anan-shi, Tokushima (JP)

(72) Inventors: Yoshitomo Miyashita, Anan (JP); Keisuke Fujihara, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 417 days.

(21) Appl. No.: 14/539,011

(22) Filed: Nov. 12, 2014

(65) Prior Publication Data

US 2015/0132653 A1     May 14, 2015

(30) Foreign Application Priority Data

Nov. 12, 2013 (JP) ................. 2013-233883

(51) Int. Cl.
| | |
|---|---|
| H01M 4/36 | (2006.01) |
| H01M 4/62 | (2006.01) |
| H01M 4/04 | (2006.01) |
| H01M 4/131 | (2010.01) |
| H01M 4/1391 | (2010.01) |
| H01M 4/525 | (2010.01) |
| H01M 4/505 | (2010.01) |

(52) U.S. Cl.
CPC ......... *H01M 4/366* (2013.01); *H01M 4/0471* (2013.01); *H01M 4/131* (2013.01); *H01M 4/1391* (2013.01); *H01M 4/62* (2013.01); *H01M 4/505* (2013.01); *H01M 4/525* (2013.01)

(58) Field of Classification Search
None
See application file for complete search history.

(56) References Cited

U.S. PATENT DOCUMENTS

| | | | |
|---|---|---|---|
| 5,153,081 A | 10/1992 | Thackeray et al. | |
| 5,240,794 A | 8/1993 | Thackeray et al. | |
| 5,955,219 A | 9/1999 | Nishijima et al. | |
| 6,017,654 A | 1/2000 | Kumta et al. | |
| 6,214,493 B1 | 4/2001 | Bruce et al. | |
| 6,333,128 B1 | 12/2001 | Sunagawa et al. | |
| 6,551,743 B1 | 4/2003 | Nakanishi et al. | |
| 6,677,082 B2 | 1/2004 | Thackeray et al. | |
| 6,680,143 B2 | 1/2004 | Thackeray et al. | |
| 7,049,031 B2 | 5/2006 | Johnson et al. | |
| 7,135,252 B2 | 11/2006 | Thackeray et al. | |
| 7,205,072 B2 | 4/2007 | Kang et al. | |
| 7,314,682 B2 | 1/2008 | Thackeray et al. | |
| 7,314,684 B2 | 1/2008 | Kang et al. | |
| 7,393,476 B2 | 7/2008 | Shiozaki et al. | |
| 7,435,402 B2 | 10/2008 | Kang et al. | |
| 7,468,223 B2 | 12/2008 | Thackeray et al. | |
| 7,732,096 B2 | 6/2010 | Thackeray et al. | |
| 9,293,236 B2 | 3/2016 | Kawakami et al. | |
| 9,780,370 B2 | 10/2017 | Lee et al. | |
| 2002/0022183 A1 | 2/2002 | Ogawa et al. | |
| 2007/0003834 A1 | 1/2007 | Gao et al. | |
| 2008/0318131 A1 | 12/2008 | Watanabe et al. | |
| 2009/0087362 A1 | 4/2009 | Sun et al. | |
| 2009/0127520 A1 | 5/2009 | Whitfield et al. | |
| 2010/0209771 A1* | 8/2010 | Shizuka | B82Y 30/00 429/207 |
| 2011/0165460 A1* | 7/2011 | Jito | H01M 4/134 429/218.1 |
| 2013/0309576 A1 | 11/2013 | Ogata et al. | |

(Continued)

FOREIGN PATENT DOCUMENTS

| | | |
|---|---|---|
| JP | H0837007 A | 2/1996 |
| JP | H8171935 A | 7/1996 |
| JP | H08213015 A | 8/1996 |

(Continued)

OTHER PUBLICATIONS

Neudecker et al., "Lithium Manganese Nickel Oxides Lix(MnyNi1—y)2—xO2, Part 1 Synthesis and Characterization of Thin Films and Bulk Phases, and Part 2 Electrochemical Studies on Thin-Film Batteries," J. Electrochem. Soc., 1998, 145:4148-4168. Thackeray et al., "Li2Mno3—stabilized LiMO2 (M=Mn,Ni, Co) electrodes for lithium-ion batteries," J. Mater.Chem., vol. 17, pp. 3112-3125 (2007) ("Thackeray 2007").

Rossouw et al., Lithium Manganese Oxides from Li2Mn03 for Rechargeable Lithium Battery Applications, Mat. Res. Bull., vol. 26, pp. 463-473, 1991.

(Continued)

*Primary Examiner* — Carmen V Lyles-Irving
(74) *Attorney, Agent, or Firm* — Hunton Andrews Kurth LLP

(57) ABSTRACT

A method of producing a positive electrode active material for a nonaqueous electrolyte secondary battery, the method including: stirring core particles including a lithium-transition metal composite oxide represented by a formula:

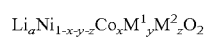

wherein $1.00 \leq a \leq 1.50$, $0.00 \leq x \leq 0.50$, $0.00 \leq y \leq 0.50$, $0.00 \leq z \leq 0.02$, $x+y \leq 0.70$, $M^1$ consists of Mn and Al, and $M^2$ is at least one element selected from the group consisting of Zr, W, Ti, Mg, Ta, Nb and Mo; mixing the core particles with a first solution containing a rare earth element and a second solution containing a fluorine-containing compound; and heating the coated core particles at a temperature no greater than 500° C.

15 Claims, No Drawings

(56) References Cited

U.S. PATENT DOCUMENTS

| | | | | | |
|---|---|---|---|---|---|
| 2014/0030598 | A1* | 1/2014 | Sakano | ................ | H01M 4/366 429/231.1 |
| 2016/0197348 | A1 | 7/2016 | Jito et al. | | |

FOREIGN PATENT DOCUMENTS

| | | |
|---|---|---|
| JP | H8273665 A | 10/1996 |
| JP | H8315819 A | 11/1996 |
| JP | H0955211 A | 2/1997 |
| JP | H9296538 A | 11/1997 |
| JP | H10106543 A | 4/1998 |
| JP | H10188982 A | 7/1998 |
| JP | H11307094 A | 11/1999 |
| JP | 200012090 A | 1/2000 |
| JP | 2000077072 A | 3/2000 |
| JP | 2002063903 A | 2/2002 |
| JP | 2008-536285 A | 9/2008 |
| JP | 2009-004316 A | 1/2009 |
| WO | 0029331 A1 | 5/2000 |
| WO | 2007129848 A1 | 11/2007 |
| WO | 2012/101949 A1 | 8/2012 |
| WO | 2015/045315 A1 | 4/2015 |

OTHER PUBLICATIONS

C. Delmas et al., Electrochemical & Physical Properties of $LixNi1—yCoyO2$ Phases, 53-56 Solid State Ionics 370, 370 (1992).

Gates Energy Products, Inc., "Section 2: Rechargeable Cells and Batteries" Rechargeable Batteries Applications Handbook, Butterworth-Heinemann, Newton, MA, pp. 10-11, (1998).

Jang et al., "Stabilization of $LiMnO2$ in the ?-$NaFeO2$ Structure Type by $LiAlO2$ Addition," Electrochemical and Solid State Letters, vol. 1, No. 1, pp. 13-16 (1998).

Ohzuku et al., Synthesis and Characterization of $LiAl1/4Ni3/4O2$ (R3m) for Lithium-Ion (Shuttlecock) Batteries, 142 J. Electrochem. Soc. 4033 (Dec. 1995).

Numata et al., "Synthesis of Solid Solutions in a System of $LiCoO2$—$Li2MnO3$ for Cathode Materials of Secondary Lithium Batteries," Chemistry Letters (1997), pp. 725-726 ("Numata").

Numata, et al., "Synthesis and characterization of layer structured solid solutions in the system $LiCoO2$—$Li2MnO3$," Solid State Ionics, 117 (1999): 257-263.

Rossen et al., "Structure and Electrochemistry of $LixMnyNi1—yO2$," Solid State Ionics, vol. 57, Issues 3-4, Oct. 1992, pp. 311-318 ("Rossen").

Thackeray, "Lithiated Oxides for Lithium-Ion Batteries," The 186th meeting, the Electrochemical Society Symposium, Oct. 9-14, 1994, Miami Beach, Florida, published on Jan. 1, 1995 ("Thackeray 1994").

Excerpts from Linden, Handbook of Batteries, 2nd Edition (1995), pp. 1.3-1.5, 36.4-36.17, 36.22-36.27, 36.42-36.59, A.1, A.2, A.7, A.8.

Kaewmala et al., "$Li2MnO3$ domain size and current rate dependence on the electrochemical properties of $0.5Li2MnO3$—$0.5LiCoO2$ cathode material," Scientific Reports.

Rossouw et al., "Synthesis and Structural Characterization of a Novel Layered Lithium Manganese Oxide, $Li0.36Mn0.91 O2$, and its Lithiated Derivative, $Li1.09Mn0.91 O2$," Journal of Solid State Chem., vol. 104, pp. 464-466 (1993).

Yoshio et al., "Preparation of $LiYMnxNi1\_xO2$ as a cathode for lithium-ion batteries," Journal of Power Sources 74 (I 998) 46-53.

Spahr et al., Characterization of Layered Lithium Nickel Manganese Oxides Synthesized by a Novel Oxidative coprecipitation Method and Their Electrochemical Performance as Lithium Insertion Electrode Materials, J. Electrochem. Soc., vol. 145, No. 4, Apr. 1998.

Armstrong et al., Synthesis of layered $LiMnO2$ as an electrode for rechargeable lithium batteries.

* cited by examiner

METHOD OF PRODUCING POSITIVE ELECTRODE ACTIVE MATERIAL FOR NON-AQUEOUS ELECTROLYTE SECONDARY BATTERY, POSITIVE ELECTRODE FOR NON-AQUEOUS ELECTROLYTE SECONDARY BATTERY, AND NON-AQUEOUS ELECTROLYTE SECONDARY BATTERY

CROSS-REFERENCE TO RELATED APPLICATIONS

This application claims priority under 35 USC 119 from Japanese patent Application No. 2013-233883, filed on Nov. 12, 2013, the disclosures of which are incorporated by reference herein.

BACKGROUND OF THE INVENTION

1. Field of the Invention

The present disclosure relates to a method of producing a positive electrode active material for a non-aqueous electrolyte secondary battery such as a lithium ion secondary battery.

2. Description of Related Art

In recent years, mobile equipment such as VTRs, mobile phones and notebook personal computers has been prevailing and has been reduced in size, and as an electric power supply source therefor, a non-aqueous electrolyte secondary battery such as a lithium ion secondary battery has come to be used. Furthermore, from an aspect of dealing with recent environmental problems, the battery has also been attracting attention as a battery for motive power of an electric vehicle or the like.

As a positive electrode active material for a lithium secondary battery, a lithium-cobalt composite oxide, which is one capable of constituting a 4 V class secondary battery, has been generally and widely employed.

Since cobalt, which is a raw material of $LiCoO_2$, is a scarce resource and unevenly distributed, cobalt is available at a high cost and the raw material supply is unstable.

Responding to these circumstances, a lithium-transition metal composite oxide with a layered structure, such as a lithium-nickel-cobalt-manganese composite oxide, in which a part of Co in $LiCoO_2$ is substituted with an element such as Ni, Mn or the like has been developed.

There is a technique for coating the surface of lithium-transition metal composite oxide particles with a compound of various elements to impart an additional specific function. Examples of the element used for coating also include a rare earth element and fluorine.

In JP 2008-536285 T, there is disclosed a positive electrode active material prepared by coating the surface of a lithium-transition metal composite oxide such as lithium-cobalt composite oxide with a fluorine compound such as lithium fluoride. It has been reported that the deterioration in cycle characteristics at high voltages and high rates can be prevented by such a constitution.

SUMMARY OF THE INVENTION

The method of producing a positive electrode active material according to the embodiment of the present invention includes stirring core particles including a lithium-transition metal composite oxide represented by a formula:

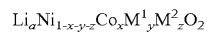

wherein $1.00 \leq a \leq 1.50$, $0.00 \leq x \leq 0.50$, $0.00 \leq y \leq 0.50$, $0.00 \leq z \leq 0.02$, $x+y \leq 0.70$, $M^1$ is at least one element selected from the group consisting of Mn and Al, and $M^2$ is at least one element selected from the group consisting of Zr, W, Ti, Mg, Ta, Nb and Mo;

mixing the core particles with a first solution containing a rare earth element and a second solution containing a fluorine-containing compound, each independently, by adding dropwise the first solution and the second solution as the core particles are being stirred until the amount of the rare earth element added reaches 0.02 mol % to 0.15 mol % based on the amount of the core particles and the amount of the elemental fluorine added reaches 0.07 mol % to 0.5 mol % based on the amount of the core particles to yield coated core particles; and heating the coated core particles at a temperature no greater than 500° C.

According to the above-mentioned aspect of the method of producing a positive electrode active material of the present embodiment, it is possible to form a coating layer which is capable of enhancing the cycle characteristics at high voltages on the surface of core particles composed of a lithium-nickel based composite oxide as a lithium-transition metal composite oxide. With regard to a non-aqueous electrolyte secondary battery using the positive electrode active material thus obtained, it becomes possible to enhance the cycle characteristics at high voltages.

DETAILED DESCRIPTION OF EMBODIMENTS

In view of the recent demand for a secondary battery with a high energy density, there is a technique for heightening the charging voltage of a secondary battery. However, in a nonaqueous electrolyte secondary battery using a lithium-transition metal composite oxide as a positive electrode active material, when the charging voltage is heightened, the structural collapse of the positive electrode active material occurs from around the time when the charging voltage reaches 4.3 V, the reactivity between a constituent element in the positive electrode active material and the nonaqueous electrolyte is enhanced, and the decomposition of the non-aqueous electrolyte is accelerated. As a result thereof, the cycle characteristics of the non-aqueous electrolyte secondary battery deteriorate. This tendency is especially remarkable in a lithium-transition metal composite oxide (the so-called lithium-nickel-based composite oxide) using nickel as a transition metal such as a lithium-nickel composite oxide.

Although the technique specifically disclosed in JP 2008-536285 T is one for precipitating lithium fluoride and the like on the surface of lithium-cobalt composite oxide particles in a solution, in a lithium-nickel-based composite oxide as a lithium-transition metal composite oxide, the cycle characteristics at high voltages cannot be improved by using the coating layer thus obtained. As such, measures have been required. Also in JP 2008-536285 T, a rare earth element fluoride such as europium fluoride is also described as a possible form of the fluorine compound, only a few compounds such as lithium fluoride are specifically disclosed.

The present invention has been made in view of these circumstances. An object of the present invention is to attain a positive electrode active material containing a lithium-nickel-based composite oxide as lithium-transition metal composite oxide with which non-aqueous electrolyte secondary battery can be improved in cycle characteristics at high voltages.

As a result of extensive research for achieving the object, the present inventors have completed the present invention. The present inventors have found that the cycle characteristics of a nonaqueous electrolyte secondary battery at high voltages are enhanced by using a positive electrode active material prepared by forming a coating layer including a rare earth and fluorine on the surface of core particles composed of a lithium-nickel-based composite oxide as a lithium-transition metal composite oxide via a specific process.

Hereinafter, the method of producing a positive electrode active material according to the present invention will be described in detail with reference to embodiments and examples. However, the present invention is not limited to these embodiments and examples.

The term "step" as used herein encompasses not only an independent step but also a step in which the anticipated effect of this step is achieved, even if the step cannot be clearly distinguished from another step. Unless specifically indicated, in a case in which each ingredient of a composition includes plural materials, the content of each ingredient of the composition denotes the total amount of the plural materials included in the composition.

The method of producing a positive electrode active material according to the present embodiment includes steps of: stirring core particles including a lithium-transition metal composite oxide represented by a formula:

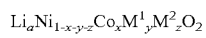

$$Li_aNi_{1-x-y-z}Co_xM^1_yM^2_zO_2$$

wherein $1.00 \leq a \leq 1.50$, $0.00 \leq x \leq 0.50$, $0.00 \leq y \leq 0.50$, $0.00 \leq z \leq 0.02$, $x+y \leq 0.70$, $M^1$ is at least one element selected from the group consisting of Mn and Al, and $M^2$ is at least one element selected from the group consisting of Zr, W, Ti, Mg, Ta, Nb and Mo; mixing the core particles with a first solution containing a rare earth element and a second solution containing a fluorine-containing compound, each independently, by adding dropwise the first solution and the second solution as the core particles are being stirred until the amount of the rare earth element added reaches 0.02 mol % to 0.15 mol % based on the amount of the core particles and the amount of the elemental fluorine added reaches 0.07 mol % to 0.5 mol % based on the amount of the core particles to yield coated core particles; and heating the coated core particles at a temperature no greater than 500° C.

(Core Particles)

As a core particle, a lithium-transition metal composite oxide essentially containing nickel (the so-called lithium-nickel-based composite oxide) is used. A part of nickel sites may be substituted with cobalt, manganese and aluminum. An another element may be further contained therein.

In a case where a part of nickel sites is substituted with cobalt, up to 50 mol % of nickel can be substituted therewith. It is preferred that the amount of cobalt is small because production costs may be increased when the amount is too large. In consideration of balance with various characteristics, a preferred amount of the site substituted is 5 mol % to 35 mol %.

In a case where a part of nickel sites is substituted with at least one element selected from the group consisting of manganese and aluminum, for each thereof, up to 50 mol % of nickel can be substituted therewith. Care should be taken because there is a possibility of adversely affecting the output characteristics and the charge and discharge capacity when the amount is too large. In this connection, since there is a tendency for the charge and discharge capacity to be reduced when the amount of nickel in nickel sites is too small, the whole amount of the nickel site substituted is set to 70 mol % or less. In consideration of balance with various characteristics, the whole amount of the site substituted is preferably 20 mol % to 60 mol %.

An element to be further contained in the composition of core particles can be selected from the group consisting of zirconium, tungsten, titanium, magnesium, tantalum, niobium, molybdenum and the like. When the content of these elements is up to 2 mol %, various purposes can be achieved without adversely affecting other characteristics. For example, zirconium is suitable for the improvement of storage characteristics.

Although the output characteristics tend to be enhanced when the amount of lithium in the core particle composition is large, core particles in which the amount of lithium is too large are difficult to be synthesized. Moreover, even when the core particles are synthesized, sintering proceeds and there is a tendency for subsequent handling to become difficult. Based on the above, the amount of lithium is set to 100 mol % or more and 150 mol % or less relative to the element in nickel sites. In consideration of balance of the characteristics, ease of synthesis and the like, the amount thereof is preferably 105 mol % or more and 125 mol % or less.

Based on the above, the core particle in the positive electrode active material of the present invention is represented by a formula $Li_aNi_{1-x-y}Co_xM^1_yM^2_wO_2$, wherein $1.00 \leq a \leq 1.50$, $0.00 \leq x \leq 0.50$, $0.00 \leq y \leq 0.50$, $0.00 \leq w \leq 0.02$, $0.00 \leq x+y \leq 0.70$, $M^1$ is at least one selected element from the group consisting of Mn and Al, and $M^2$ is at least one element selected from the group consisting of Zr, W, Ti, Mg, Ta, Nb and Mo. However, at this rate, the crystal structure of the core particle begins to collapse from around the time when the charging voltage reaches 4.3 V, and the reaction between the transition metal in the core particle and the electrolyte is accelerated. On that account, the core particle needs to be provided with a heat-treated coating layer described below.

(Coating Layer)

A heat-treated coating layer, hereinafter also referred to "coating layer", includes a rare earth element and elemental fluorine. Although it is assumed that most of the rare earth elements and the fluorine in the coating layer exist as rare earth fluorides, a part of the rare earth elements and a part of the fluorine can exist as a rare earth compound other than the fluoride and a fluoride of an element other than the rare earth element, respectively. Moreover, a part of the rare earth elements and/or the fluorine can be chemically bonded to a part of elements constituting the core particles. The state of a coating layer can be confirmed from spectra measured by Auger electron spectroscopy (AES). The presence of such a coating layer suppresses the collapse of the crystal structure of the core particle at the time of charging at high voltages, and contributes to the stabilization of the non-aqueous electrolyte. As a result thereof, the cycle characteristics at high voltages are improved.

When the amounts of the rare earth elements and the elemental fluorine in the coating layer are too small relative to the amount of the core particles, the effect is not sufficiently exerted, and when the amounts thereof are too large, the reduction in output characteristics and charge and discharge capacity is caused. On that account, the amount of the rare earth elements is set to 0.02 mol % to 0.15 mol % based on the amount of the core particles. Moreover, the amount of the elemental fluorine is set to 0.07 mol % to 0.5 mol % based on the amount of the core particles.

The state of a coating layer is one obtained by the method of producing a positive electrode active material according to the present embodiment. The effect described above is exerted by a coating layer thus obtained and it becomes possible to sufficiently take advantage of the merit of the lithium-nickel-based composite oxide.

As the rare earth element, at least one element can be selected from the group consisting of yttrium, scandium, a lanthanoid series element and an actinoid series element. In particular, when erbium is selected, the coating layer is preferred because the inhibitory effect on collapse of the crystal structure described above is great and the decomposition of the non-aqueous electrolyte is further suppressed.

(Method of Producing Positive Electrode Active Material)

Next, a method of producing a positive electrode active material will be described. As previously described, the production method of the present embodiment is a production method of forming a coating layer by which the effect described previously is exerted on the surface of core particles. The production method of the present embodiment includes a mixing step and a heat treatment step. Hereinafter, both the steps will be mainly described.

<Production of Core Particles>

Core particles can be produced by a known method. An example of the method may include mixing raw material compounds to be decomposed into an oxide at high temperatures according to the desired composition to obtain a raw material mixture and calcining the raw material mixture at a suitable temperature. An another example of the method may include dissolving raw material compounds soluble in a solvent, and then, precipitating precursors to obtain a raw material mixture, for example, by adjusting the temperature, adjusting pH, charging a complexing agent, and so forth, and calcining the raw material mixture at a suitable temperature.

<Mixing Step>

The resulting core particles are stirred with a suitable stirring apparatus, and a first solution containing a rare earth element and a second solution containing fluorine-containing compound, each independently are added dropwise as the core particles are being stirred until the amount of the rare earth element added reaches 0.02 mol % to 0.15 mol % or less based on the amount of the core particles and the amount of the elemental fluorine added reaches 0.07 mol % to 0.5 mol % based on the amount of the core particles to yield coated core particles. In this way, by dropping a small amount of a liquid phase which is a starting material and forms the basis of the heat-treated coating layer, it is possible to prevent an element constituting the core particle from being eliminated from the core particle, and to prevent the reduction in output characteristics and charge and discharge capacity. If a total amount of the first solution and the second solution (total amount of liquid phases) is too large relative to the amount of the core particles, elimination of an element constituting the core particle may result. The total amount of liquid phases may be 20% by weight or less based on the amount of the core particles. A practical amount of the liquid phase is about 1% by weight or more based on the amount of the core particles. The concentrations of the first solution and the second solution can be appropriately selected according to the amounts of the rare earth elements and the elemental fluorine in the coating layer and the total amount of liquid phases based on the amount of the core particles. The solvents in the first solution and the second solution may be appropriately selected according to the solute, the purpose and the like, and examples thereof include water, a lower alcohol and the like.

With regard to the coated core particle, the first solution and the second solution exist on the surface of the core particle, or furthermore, a reactant between the first solution and the second solution, for example a rare earth fluoride or the like, exists thereon. By the heat treatment step described below, materials existing on the core particle surface are finally converted into a heat-treated coating layer.

<Heat Treatment Step>

The resulting coated core particles are heated at a suitable temperature to form the heat-treated coating layer on the surface of the core particles. As described above, although it is considered that the heat-treated coating layer mainly contains a rare earth fluoride, the heat-treated coating layer can also contain substances having other forms such as a reactant between an element constituting the core particle and a rare earth element and/or fluorine, and an unreacted solute in the first solution and/or the second solution.

When the heat treatment temperature is too high, the reaction between an element constituting the core particle and a rare earth element and/or fluorine proceeds excessively and the inherent characteristics of the core particle are impaired. On that account, the heat treatment temperature is set to less than 500° C. A preferred treatment temperature is 200° C. to 400° C.

Hereinafter, the present embodiment will be described in more detail with reference to examples.

Example 1

To pure water in the state of being stirred in a reaction vessel, each of aqueous solutions of nickel sulfate, cobalt sulfate and manganese sulfate was added dropwise at a flow ratio satisfying the equation of Ni:Co:Mn=35:35:30. After the completion of dropping, the liquid temperature was controlled to 50° C. and a prescribed amount of an aqueous sodium hydroxide solution was added dropwise to obtain a precipitate of a nickel cobalt manganese composite hydroxide. The resultant precipitate was washed with water, filtered, separated and mixed with lithium carbonate and zirconium(IV) oxide so as to satisfy the equation of Li:(Ni+Co+Mn):Zr=1.11:1:0.005 to obtain a mixed raw material. The resulting mixed raw material was calcined for 15 hours at 890° C. under an air atmosphere to obtain a sintered body. The resulting sintered body was pulverized and subjected to dry screening to obtain a lithium-transition metal composite oxide represented by a composition formula $Li_{1.10}Ni_{0.348}Co_{0.348}Mn_{0.299}Zr_{0.005}O_2$.

The resulting powder of the lithium-transition metal composite oxide was stirred with a stirrer. To the stirred powder of the lithium-transition metal composite oxide, an aqueous erbium sulfate solution of 0.1 mol/L and an aqueous ammonium fluoride solution of 11 mol/L as coating raw materials were added dropwise so that the amount of erbium became 0.08 mol % and the amount of elemental fluorine became 0.24 mol % relative to the lithium-transition metal composite oxide.

After the completion of dropping, the mixture was stirred over a certain period of time. After the completion of stirring, the powder of a lithium-transition metal composite oxide containing coating raw materials was subjected to a heat-treatment for 5 hours at 300° C. in atmosphere to obtain an aimed positive electrode active material.

Example 2

A desired positive electrode active material was obtained in the same manner as that in Example 1 except that the heat treatment temperature was set to 200° C.

Example 3

A desired positive electrode active material was obtained in the same manner as that in Example 1 except that in place of the aqueous ammonium fluoride solution of 11 mol/L, an aqueous potassium fluoride solution of 5 mol/L was used.

Example 4

To pure water in the state of being stirred in a reaction vessel, each of aqueous solutions of nickel sulfate, cobalt sulfate and manganese sulfate was added dropwise at a flow rate ratio satisfying the equation of Ni:Co:Mn=50:20:30. After the completion of dropping, the liquid temperature was controlled to 50° C. and a prescribed amount of an aqueous sodium hydroxide solution was added dropwise to obtain a precipitate of a nickel cobalt manganese composite hydroxide. The resultant precipitate was washed with water, filtered, separated and mixed with lithium carbonate and zirconium(IV) oxide so as to satisfy the equation of Li:(Ni+Co+Mn):Zr=1.11:1:0.005 to obtain a mixed raw material. The resulting mixed raw material was calcined for 15 hours at 890° C. under an air atmosphere to obtain a sintered body. The resulting sintered body was pulverized and subjected to dry screening to obtain a lithium-transition metal composite oxide represented by a composition formula $Li_{1.10}Ni_{0.498}Co_{0.199}Mn_{0.298}Zr_{0.005}O_2$.

In the following, a desired positive electrode active material was obtained in the same manner as that in Example 1.

Comparative Example 1

The lithium-transition metal composite oxide in Example 1 was employed as a positive electrode active material for comparison.

Comparative Example 2

A desired positive electrode active material was obtained in the same manner as that in Example 1 except that only an aqueous erbium sulfate solution of 0.1 mol/L was charged as the coating raw material and the charged amount of erbium was 0.08 mol % relative to the lithium-transition metal composite oxide.

Comparative Example 3

A desired positive electrode active material was obtained in the same manner as that in Example 1 except that the amount of a coating raw material charged as the rare earth was 0.02 mol % and the amount of a coating raw material charged as the fluorine was 0.06 mol %.

Comparative Example 4

A desired positive electrode active material was obtained in the same manner as that in Example 1 except that the heat treatment temperature was set to 500° C.

Comparative Example 5

The lithium-transition metal composite oxide in Example 4 was employed as a positive electrode active material for comparison.

Evaluation of Cycle Characteristics

A battery for evaluation was prepared by the following procedure using each of positive electrode active materials obtained in Examples 1 to 4 and Comparative Examples 1 to 5 and was evaluated for cycle characteristics.

1. Preparation of Positive Electrode

In NMP (N-methyl-2-pyrrolidone), 85 parts by weight of a positive electrode composition, 10 parts by weight of acetylene black and 5.0 parts by weight of PVDF (polyvinylidene fluoride) were dispersed to prepare a positive electrode slurry. The resulting positive electrode slurry was applied to a sheet of aluminum foil and dried, after which the sheet was subjected to compression molding with a roll press machine and cut into pieces with a prescribed size to obtain a positive electrode.

2. Preparation of Negative Electrode

In water, 97.5 parts by weight of artificial graphite, 1.5 parts by weight of CMC (carboxymethyl cellulose) and 1.0 part by weight of SBR (styrene-butadiene rubber) were dispersed to prepare a negative electrode slurry. The resulting negative electrode slurry was applied to a sheet of copper foil and dried, after which the sheet was subjected to compression molding with a roll press machine and cut into pieces with a prescribed size to obtain a negative electrode.

3. Preparation of Nonaqueous Electrolyte

EC (ethylene carbonate) and MEC (methyl ethyl carbonate) were mixed at a volume ratio of 3:7 to prepare a solvent. In the resulting mixed solvent, lithium hexafluorophosphate ($LiPF_6$) was dissolved so that the concentration thereof became 1 mol/L to obtain a nonaqueous electrolyte.

4. Assembly of Battery for Evaluation

Current collectors of the positive electrode and the negative electrode each were fitted with lead electrodes, after which vacuum drying was performed at 120° C. Then, a separator composed of porous polyethylene was interposed between the positive electrode and the negative electrode, and the stack of the pair of electrodes and the separator was housed in a bag-shaped laminate pack. After being housed, the stack was dried under vacuum at 60° C. to remove moisture adsorbed on each member. After vacuum drying, the previously described non-aqueous electrolyte was injected into the laminate pack, and the laminate pack was sealed to obtain a laminate type non-aqueous electrolyte secondary battery for evaluation.

5. Measurement of Discharge Capacity Retention Ratio

The resulting battery was subjected to aging with a weak current, and the electrolyte was well permeated into the positive electrode and the negative electrode. After aging, the battery was placed in a thermostatic chamber inside which the temperature was set to 20° C., and charging and discharging were repeated with one cycle being constituted of charging at a charging potential of 4.3 V and a charging current of 1.0 C (1 C indicates a current with which the discharging is completed at the end of 1 hour) and discharging at a discharging potential of 2.75 V and a discharging current of 1.0 C. The value obtained by dividing a discharge capacity at the n-th cycle by a discharge capacity at the first cycle was defined as the discharge capacity retention ratio at the n-th cycle Es (n). Being high in discharge capacity retention ratio means being satisfactory in cycle characteristics. Moreover, a charge capacity at the first cycle and a discharge capacity at the first cycle were defined as the charge capacity Ec of a secondary battery and the discharge capacity Ed of a secondary battery, respectively.

Evaluation of Output Characteristics

A battery for evaluation using each of positive electrode active materials obtained in Examples 1 to 4 and Comparative Examples 1 to 5 was evaluated for output characteristics in the following way.

A battery for evaluation which was the same as that for cycle characteristics evaluation was subjected to aging by allowing a weak current to flow, and the electrolyte was well permeated to the positive electrode and the negative electrode. Then, discharging by a high current and charging by a weak current were repeated. A charge capacity at 10th charging was defined as the full charge capacity of the battery, and after 10th discharging, the battery was charged to 40% of the full charge capacity. After charging, the battery was placed in a thermostatic chamber inside which the temperature was set to a specific temperature of T° C. and allowed to stand for 6 hours, after which the battery was discharged at 0.02 A, 0.04 A and 0.06 A to measure voltages. The current was taken as abscissa, the voltage was taken as ordinate, intersections thereof were plotted, and an inclination of a straight line obtained by connecting the intersections was defined as the direct current-internal resistance (DC-IR) at T° C. R (T). Being low in the R (T) means being satisfactory in output characteristics.

The producing conditions for positive electrode active materials in Examples 1 to 4 and Comparative Examples 1 to 5 and various battery characteristics are shown in Table 1 and Table 2, respectively.

thereof is insufficient in Comparative Examples 2 to 4 where the heat treatment temperature is too high or the charged amount of fluorine is not appropriate. On the other hand, in Examples 1 to 3, similar cycle characteristics to those in the case of employing the conventional charging voltage are exhibited. Moreover, the formation of the coating layer does not adversely affect other characteristics.

With regard to a non-aqueous electrolyte secondary battery using a positive electrode in which the positive electrode active material obtained by the method of the present invention is used, the cycle characteristics do not deteriorate even when the charging voltage is set to a high voltage of 4.3 V or higher. On that account, it is possible to realize satisfactory cycle characteristics at the time of charging at high voltages while taking advantage of high charge and discharge capacity and high output of a lithium-nickel-based composite oxide positive electrode active material. In particular, such a secondary battery can be suitably utilized as

TABLE 1

| | Core particle composition | Rare earth raw material | Charged amount*/ mol % | Fluorine raw material | Charged amount**/ mol % | Heat treatment temperature/ ° C. |
|---|---|---|---|---|---|---|
| Example 1 | $Li_{1.10}Ni_{0.348}Co_{0.348}Mn_{0.299}Zr_{0.005}O_2$ | 0.1 mol/L $Er_2(SO_4)_3$aq | 0.08 | 11 mol/L $NH_4F$aq | 0.24 | 300 |
| Example 2 | | | | | | 200 |
| Example 3 | | | | 5 mol/L KFaq | | 300 |
| Comparative Example 1 | | — | — | — | — | — |
| Comparative Example 2 | | 0.1 mol/L $Er_2(SO_4)_3$aq | 0.08 | — | — | 300 |
| Comparative Example 3 | | | 0.02 | 11 mol/L $NH_4F$aq | 0.06 | 300 |
| Comparative Example 4 | | | 0.08 | | 0.24 | 500 |
| Example 4 | $Li_{1.10}Ni_{0.498}Co_{0.199}Mn_{0.298}Zr_{0.005}O_2$ | 0.1 mol/L $Er_2(SO_4)_3$aq | 0.08 | 11 mol/L $NH_4F$aq | 0.24 | 300 |
| Comparative Example 5 | | — | — | — | — | — |

*Amount of rare earth element based on amount of core particles
**Amount of fluorine element based on amount of core particles

TABLE 2

| | Ec/ $mAhg^{-1}$ | Ed/ $mAhg^{-1}$ | Es (200)/% | R (25)/Ω | R (−25)/Ω |
|---|---|---|---|---|---|
| Example 1 | 177 | 159 | 83 | 1.7 | 19 |
| Example 2 | 177 | 158 | 83 | 1.6 | 17 |
| Example 3 | 177 | 158 | 83 | 1.6 | 18 |
| Comparative Example 1 | 177 | 159 | 49 | 1.7 | 19 |
| Comparative Example 2 | 177 | 158 | 69 | 1.6 | 19 |
| Comparative Example 3 | 178 | 160 | 40 | 1.6 | 17 |
| Comparative Example 4 | 177 | 158 | 57 | 1.7 | 19 |

The results in Tables 1 and 2 reveal the following.

In the battery prepared with a positive electrode active material of Comparative Example 1 which is composed only of core particles, the cycle characteristics extremely deteriorate when the charging voltage is set to 4.3 V. On the other hand, in the batteries respectively prepared with a positive electrode active material of Examples 1 to 3 and Comparative Examples 2 to 4 which is composed of core particles and a coating layer formed on the core particles, the cycle characteristics are improved. The improvement effect a power source for large-sized equipment requiring high energy density, high output and a long life such as an electric vehicle.

As described above, it should be obvious that various other embodiments are possible without departing the spirit and scope of the present invention. Accordingly, the scope and spirit of the present invention should be limited only by the following claims.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of producing a positive electrode active material having a coating layer containing erbium fluoride for a non-aqueous electrolyte secondary battery, the method comprising:

stirring core particles comprising a lithium-transition metal composite oxide represented by a formula:

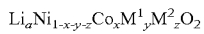

$Li_aNi_{1-x-y-z}Co_xM^1_yM^2_zO_2$ wherein 1.00≤a≤1.50, 0.00≤x≤0.50, 0.00≤y≤0.50, 0.00≤z≤0.02, x+y≤0.70, $M^1$ consists of Mn and Al, and $M^2$ is at least one element selected from the group consisting of Zr, W, Ti, Mg, Mo, Ta and Nb;

mixing the core particles with a first solution comprising a rare earth element and a second solution comprising a compound containing an elemental fluorine, each independently, by adding dropwise the first solution and the second solution as the core particles are being stirred until an amount of the rare earth element added reaches 0.02 mol % to 0.15 mol % based on an amount of the core particles and an amount of the elemental fluorine added reaches 0.07 mol % to 0.5 mol % based on the amount of the core particles to yield coated core particles; and heating the coated core particles at a temperature ranging from 200° C. to 400° C. to obtain the positive electrode active material having the coating layer containing erbium fluoride, wherein the rare earth element is erbium.

2. The method according to claim 1, wherein a total amount of the first solution and the second solution added is 1% by weight to 20% by weight based on the amount of the core particles.

3. The method according to claim 1, wherein $0.05 \leq x \leq 0.50$.

4. The method according to claim 1, wherein $0.00 \leq x \leq 0.35$.

5. The method according to claim 1, wherein $0.05 \leq x \leq 0.35$.

6. The method according to claim 1, wherein $0.20 \leq x+y \leq 0.70$.

7. The method according to claim 1, wherein $x+y \leq 0.60$.

8. The method according to claim 1, wherein $0.20 \leq x+y \leq 0.60$.

9. The method according to claim 1, wherein $1.05 \leq a \leq 1.50$.

10. The method according to claim 1, wherein $1.00 \leq a \leq 1.25$.

11. The method according to claim 1, wherein $1.05 \leq a \leq 1.25$.

12. A method of producing a positive electrode active material having a coating layer containing erbium fluoride for a non-aqueous electrolyte secondary battery, the method comprising:

stirring core particles comprising a lithium-transition metal composite oxide represented by a formula:

$$Li_aNi_{1-x-y-z}Co_xM^1_yM^2_zO_2$$

wherein $1.00 \leq a \leq 1.50$, $0.00 \leq x \leq 0.50$, $0.00 \leq y \leq 0.50$, $0.00 \leq z \leq 0.02$, $x+y \leq 0.70$, $M^1$ consists of Mn and Al, and $M^2$ is at least one element selected from the group consisting of Zr, W, Ti, Mg, Mo, Ta and Nb;

mixing the core particles with a first solution comprising a rare earth element and a second solution comprising a compound containing an elemental fluorine, each independently, by adding dropwise the first solution and the second solution as the core particles are being stirred until an amount of the rare earth element added reaches 0.02 mol % to 0.15 mol % based on an amount of the core particles and an amount of the elemental fluorine added reaches 0.07 mol % to 0.5 mol % based on the amount of the core particles to yield coated core particles; and heating the coated core particles at a temperature no greater than 500° C. to obtain the positive electrode active material having the coating layer containing erbium fluoride, wherein a total amount of the first solution and the second solution added is 1% by weight to 20% by weight based on the amount of the core particles, and wherein the rare earth element is erbium.

13. A method of producing a positive electrode active material having a coating layer containing erbium fluoride for a non-aqueous electrolyte secondary battery, the method comprising:

stirring core particles comprising a lithium-transition metal composite oxide represented by a formula:

$$Li_aNi_{1-x-y-z}Co_xM^1_yM^2_zO_2$$

wherein $1.00 \leq a \leq 1.50$, $0.00 \leq x \leq 0.50$, $0.00 \leq y \leq 0.50$, $0.00 \leq z \leq 0.02$, $x+y \leq 0.70$, $M^1$ consists of Mn and Al, and $M^2$ is at least one element selected from the group consisting of Zr, W, Ti, Mg, Mo, Ta and Nb;

mixing the core particles with a rare earth sulfate solution comprising a rare earth element and a second solution comprising a compound containing an elemental fluorine, each independently, by adding dropwise the rare earth sulfate solution and the second solution as the core particles are being stirred until an amount of the rare earth element added reaches 0.02 mol % to 0.15 mol % based on an amount of the core particles and an amount of the elemental fluorine added reaches 0.07 mol % to 0.5 mol % based on the amount of the core particles to yield coated core particles; and heating the coated core particles at a temperature no greater than 500° C. to obtain the positive electrode active material having the coating layer containing erbium fluoride, wherein the rare earth element is erbium.

14. The method according to claim 12, wherein the coated core particles are heated at a temperature ranging from 200° C. to 400° C. to obtain the positive electrode active material having the coating layer containing erbium fluoride.

15. The method according to claim 13, wherein the coated core particles are heated at a temperature ranging from 200° C. to 400° C. to obtain the positive electrode active material having the coating layer containing erbium fluoride.

* * * * *